(12) United States Patent
Lee et al.

(10) Patent No.: US 6,454,816 B1
(45) Date of Patent: Sep. 24, 2002

(54) SUPERCAPACITOR USING ELECTRODE OF NEW MATERIAL AND METHOD OF MANUFACTURING THE SAME

(75) Inventors: Young-hee Lee; Kay-hyeok An, both of Chonju; Jae-eun Yoo, Seoul, all of (KR)

(73) Assignee: Iljin Nanotech Co., Ltd. (KR)

( * ) Notice: Subject to any disclaimer, the term of this patent is extended or adjusted under 35 U.S.C. 154(b) by 0 days.

(21) Appl. No.: 09/805,921

(22) Filed: Mar. 15, 2001

(30) Foreign Application Priority Data

Apr. 12, 2000 (KR) .............................................. 00-19232

(51) Int. Cl.$^7$ ................................................. H01G 9/00
(52) U.S. Cl. ........................ 29/25.03; 361/502; 429/209
(58) Field of Search ............................ 29/25.01–25.03; 361/502, 503, 508, 516; 429/209

(56) References Cited

U.S. PATENT DOCUMENTS 6,205,016 B1 * 3/2001 Niu
6,280,697 B1 * 8/2001 Zhou et al.

FOREIGN PATENT DOCUMENTS

JP         10-321482       12/1998

* cited by examiner

Primary Examiner—Ha Tran Nguyen
(74) Attorney, Agent, or Firm—Burns, Doane, Swecker & Mathis LLP

(57) ABSTRACT

A supercapacitor using an electrode formed of a new material is provided. The supercapacitor includes two electrodes facing each other, the electrodes being composed of carbon nanotubes, an electrolyte provided between the two electrodes, and a separator for separating the electrolyte between the two electrodes.

10 Claims, 1 Drawing Sheet

SUPERCAPACITOR USING ELECTRODE OF NEW MATERIAL AND METHOD OF MANUFACTURING THE SAME

This application claims priority under 35 U.S.C. §§ 119 and/or 365 to 00-19232 filed in Republic of Korea on Apr. 12, 2000; the entire content of which is hereby incorporated by reference.

BACKGROUND OF THE INVENTION

1. Field of the Invention

The present invention relates to a capacitor device, and more particularly, to a supercapacitor formed of new material having the characteristics of high capacitance and high power.

2. Description of the Related Art

Batteries are usually used as energy storage devices for systems such as portable electronic equipment and electric automobiles requiring an independent power supply unit or systems which adjust instantaneously occurring overload or supply energy. However, approaches of using capacitors instead of batteries have been attempted to improve the input and output characteristics of stored electric energy in terms of electric power, that is, in terms of input and output of energy.

Capacitors have better input and output characteristics of stored electric energy than batteries and are semipermanent such that they may be reused a considerably greater number of times, i.e., more than one hundred thousand times, than the average number of times, i.e., 500 times, which batteries are usually used. Representative conventional capacitors, i.e., condensers, have capacitance on the order of only $\mu F$ or pF, so they are restrictively limited. Due to new materials developed since the early 1990s, supercapacitors such as electrochemical capacitors having capacitance of more than several tens of F and holding the merits of existing capacitors have been developed. Supercapacitors cover electrochemical capacitors, electric double layer capacitors and ultracapacitors.

Such a supercapacitor uses an electrode of activated carbon or activated carbon fiber having a specific surface of about 1000–2000 $m^2/g$ to increase energy storage volume, that is, capacitance. It is known that a capacitor using an electrode of activated carbon or activated carbon fiber has capacitance per surface area of about 10–15 $\mu F/cm^2$.

Supercapacitors have an energy density of about 1–10 Wh/kg, which is one tenth of secondary cells' energy density of about 20–100 Wh/kg. Here, the energy density indicates the energy storage volume per weight. However, supercapacitors have a power density of 1000–2000 W/kg, which is ten times higher than secondary cells' power density of 50–200 W/kg. Here, the power density indicates the volume of accumulated electric energy which can be supplied per unit time. Therefore, supercapacitors are expected to function as electric energy storage devices or load controllers in place of secondary cells. To meet this expectation, it is required to increase the capacitance of supercapacitors to the level of secondary cells.

Although activated carbon or activated carbon fiber has a relatively large specific surface as described above, its pores have a diameter of 20 Å or less so that ions cannot easily enter the pores. Accordingly, supercapacitors using an electrode formed of activated carbon or activated carbon fiber have a limitation in increasing capacitance.

SUMMARY OF THE INVENTION

To solve the above problems, it is an object of the present invention to provide a supercapacitor using an electrode of a new material, the supercapacitor having higher capacitance.

Accordingly, to achieve the above object, there is provided a supercapacitor including two electrodes facing each other, the electrodes being composed of carbon nanotubes, an electrolyte provided between the two electrodes, and a separator for separating the electrolyte between the two electrodes.

For each of the electrodes, the carbon nanotubes mixed with a bonding agent are molded into a pallet pattern. Here, the carbon nanotubes may be single-wall or multi-wall carbon nanotubes. Alternatively, each of the electrodes is formed of carbon nanotubes which are vertically grown on respective collectors.

Meanwhile, the carbon nanotubes may be activated by a solution containing potassium hydroxide. Alternatively, the carbon nanotubes may be electrolessly plated with nickel, or Raney nickel may be applied to the carbon nanotubes.

According to the present invention, a high performance supercapacitor having high capacitance and low internal resistance can be provided.

BRIEF DESCRIPTION OF THE DRAWINGS

The above object and advantages of the present invention will become more apparent by describing in detail a preferred embodiment thereof with reference to the attached drawing.

DETAILED DESCRIPTION OF THE INVENTION

Figure 1:
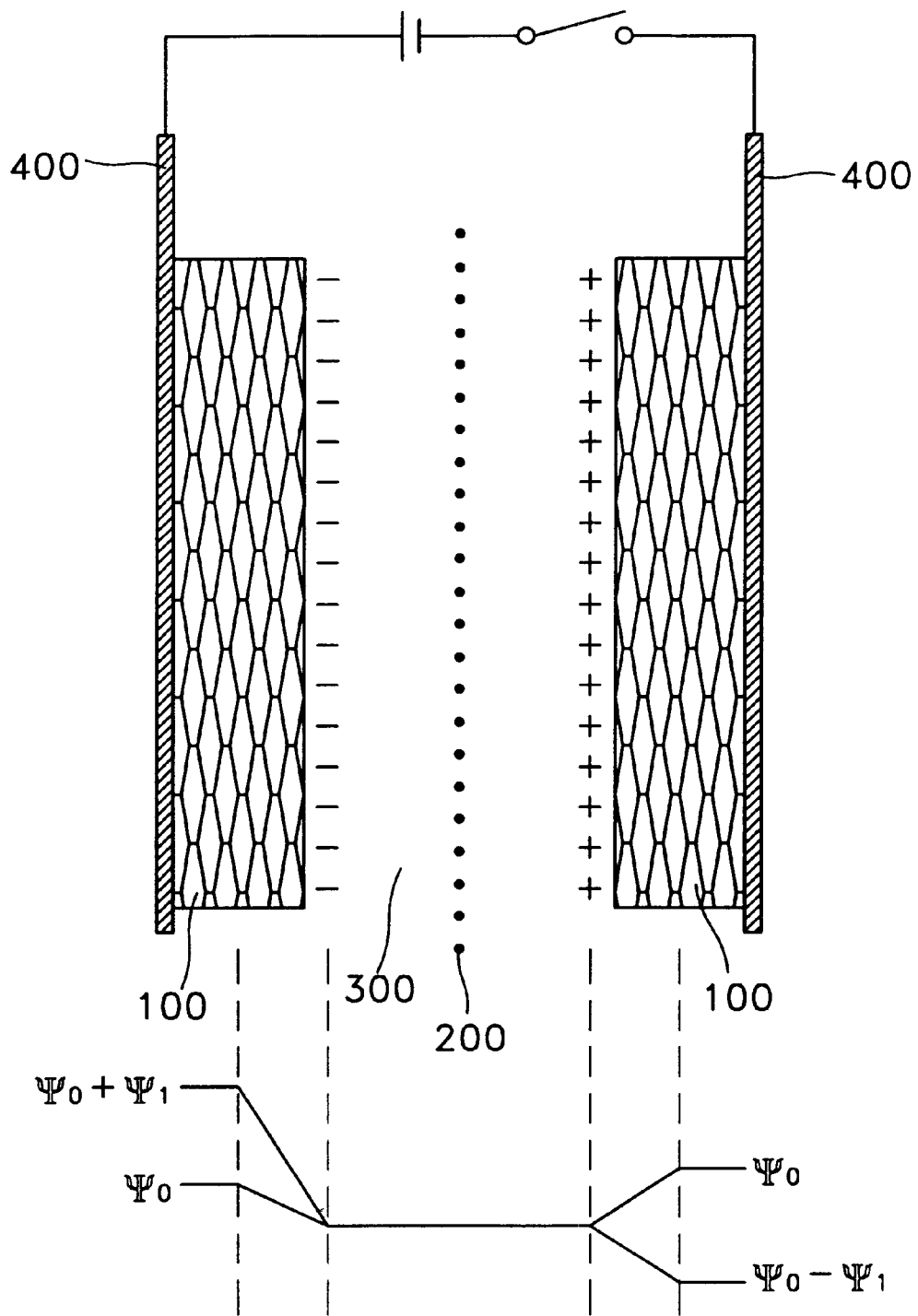
FIG. 1 is a schematic diagram for explaining a supercapacitor using an electrode of a new material according to an embodiment of the present invention.

Hereinafter, an embodiment of the present invention will be described in detail with reference to the attached drawing. The present invention is not restricted to the following embodiment, and many variations are possible within the sprit and scope of the present invention. The embodiment of the present invention is provided in order to more completely explain the present invention to anyone skilled in the art. In the drawing, the shapes of members are exaggerated for clarity.

In an embodiment of the present invention, an electrode formed of carbon nanotubes is used as an electrode of a supercapacitor. Although the specific surface of a carbon nanotube is about one tenth through one twentieth of that of activated carbon or activated carbon fiber, the carbon nanotube can offer very high capacitance per unit specific surface and low internal resistance for a supercapacitor so that a high performance supercapacitor can be manufactured using carbon nanotubes.

FIG. 1 is a schematic diagram for illustrating a supercapacitor according to the embodiment of the present invention. Referring to FIG. 1, the supercapacitor includes electrodes 100 composed of carbon nanotubes, a separator 200 and an electrolyte 300.

An electrolyte used in typical supercapacitors can be used as the electrolyte 300. A separating material used in typical supercapacitors can be used as the separator 200. The separator 200 is used to separate the electrolyte 300 between the electrodes 100 but allow the exchange of charge between the electrodes 100.

Each of the electrodes 100 is composed of carbon nanotubes. A collector 400 of a conductive material can be additionally provided to the rear of each electrode 100. The carbon nanotube electrodes 100 can be formed by molding carbon nanotubes mixed with a bonding agent into a pallet pattern. In other words, carbon nanotubes are solidified using a bonding agent and molded into a pallet pattern to be used as each of the electrodes 100. In this case, single-wall carbon nanotubes can be used. Here, a polymer resin such as a polyvinylalcohol resin, a polytetrafluoroethylene resin, a phenolic resin or a carboxylmethyl cellulose resin is used as the bonding agent.

The carbon nanotube electrodes 100 formed in a pallet pattern are attached to the respective collectors 400, thereby constituting a supercapacitor. The collectors 400 may be formed of a variety of conductive materials, but they are preferably formed of a metal.

Once current and voltage are applied to the electrodes 100 of such a supercapacitor, ions within the electrolyte 300 are separated into anions (−) and cations (+), which move to the respective oppositely charged electrodes 100. Accordingly, the potentials of the two electrodes 100 change from $\Psi_0$ into $\Psi_0+\Psi_1$ and $\Psi_0-\Psi_1$, respectively, and electric energy is stored.

Such a supercapacitor as described above has high specific capacitance due to the structural characteristics of carbon nanotubes constituting the electrodes 100. For example, when a 7.5 N potassium hydroxide (KOH) aqueous solution was used as the electrolyte 300, it was surveyed that a supercapacitor according to the embodiment of the present invention had specific capacitance of about 130 F/g. Alternatively, when an organic electrolyte obtained by dissolving 1 mol of tetraethylamonium tetrafluoroborate in acetonitrile was used as the electrolyte 300, a supercapacitor according to the embodiment of the present invention had specific capacitance of about 100 F/g. Here, a current was 10 mA/cm$^2$, and an operating voltage was 0.9 V when a 7.5 N KOH aqueous solution was used as the electrolyte and 2.3 V when an organic electrolyte obtained by dissolving 1 mol of tetraethylamonium tetrafluoroborate in acetonitrile was used as the electrolyte 300.

Instead of forming the carbon nanotube electrodes 100 by molding single-wall carbon nanotubes mixed with a bonding agent into a pallet pattern, as described above, carbon nanotubes can be directly grown on the collectors to form the carbon nanotube electrodes 100. For example, carbon nanotubes can be directly and vertically grown on a metal substrate (not shown) using a thermal chemical deposition method or a microwave plasma chemical deposition method. The vertically grown carbon nanotubes can be used as an electrode 100. Here, the metal substrate can spontaneously be used as a collector 400. A method of directly synthesizing and growing carbon nanotubes on a metal substrate to be used as a collector 400 can remove the step of molding carbon nanotubes into a pallet pattern to make the carbon nanotubes have a certain shape. In addition, since carbon nanotubes are directly grown on a metal substrate, the contact resistance between a collector 400 and a corresponding carbon nanotube electrode 100 can be substantially reduced. Here, a carbon nanotube can be grown to be a single-wall carbon nanotube or a multi-wall carbon nanotube.

A supercapacitor using the electrodes 100 of vertically grown carbon nanotubes as described above had specific capacitance of about 100 F/g when a 7.5 N KOH water solution was used as the electrolyte 300. Alternatively, when an organic electrolyte obtained by dissolving 1 mol of tetraethylamonium tetrafluoroborate in acetonitrile was used as the electrolyte 300, the supercapacitor had specific capacitance of about 70 F/g. Here, a current was 10 mA/cm$^2$, and an operating voltage was 0.9 V when a 7.5 N KOH aqueous solution was used as the electrolyte and 2.3 V when an organic electrolyte obtained by dissolving 1 mol of tetraethylamonium tetrafluoroborate in acetonitrile was used as the electrolyte 300.

When carbon nanotubes are shaped or grown and used for the electrodes 100, the specific surface of the carbon nanotubes can be increased by performing a variety of treatments thereon, so that the capacitance of a supercapacitor can be increased. Preferably, such treatments are directly performed on the carbon nanotubes before shaping them into a pallet pattern. When carbon nanotubes for each of the electrode 100 are directly grown on the corresponding collector 300, such treatments are preferably performed on the carbon nanotubes after having grown on the collector 300.

For example, by activating the carbon nanotube electrodes 100 with a KOH solution, the capacitance can be increased. Specifically, carbon nanotubes can be directly dipped in 1–5 mols of a KOH solution to activate the carbon nanotubes. Here, the carbon nanotubes may be dipped for about 24 hours. Thereafter, the carbon nanotubes may be dried for about 30 minutes at a temperature of about 750° C., or dried by performing heat treatment for about 60 minutes at a temperature of about 800° C. Through the above steps, carbon nanotubes can be substantially activated.

It was surveyed that such activated carbon nanotubes had considerably increased specific surfaces, and a supercapacitor employing the carbon nanotube electrodes 100 had considerably increased capacitance. For example, when carbon nanotubes were activated by dipping them in 1 mol of a KOH solution, the specific surface of a carbon nanotube was increased to about 250 m$^2$/g, compared to 140 m$^2$/g before the activation. Here, the capacitance of a supercapacitor using an electrode which is formed by molding such activated carbon nanotubes into a pallet pattern was about 200 F/g when a 7.5 N KOH solution was used as the electrolyte 300. Alternatively, when an organic electrolyte obtained by dissolving 1 mol of tetraethylamonium tetrafluoroborate in acetonitrile was used as the electrolyte 300, the capacitance of the supercapacitor was about 160 F/g.

Besides, when carbon nanotubes were activated by dipping them in 5 mols of a KOH solution, the specific surface of a carbon nanotube was increased to about 500 m$^2$/g. The capacitance of a supercapacitor using an electrode formed of the activated carbon nanotubes was about 400 F/g when a 7.5 N KOH solution was used as the electrolyte 300. Alternatively, when an organic electrolyte obtained by dissolving 1 mol of tetraethylamonium tetrafluoroborate in acetonitrile was used as the electrolyte 300, the capacitance of the supercapacitor was about 300 F/g.

The above results prove that the capacitance of a supercapacitor using the electrodes 100 formed of carbon nanotubes which are activated by a KOH solution is greatly increased.

Moreover, when the surfaces of carbon nanotubes are plated with a metal such as nickel (Ni), the internal resistance of a supercapacitor can be greatly reduced. For example, carbon nanotubes may be dipped in a solution of 0.1 mol of SnCl$_2$ and 0.1 mol of HCl for about 30 minutes and in a solution of 0.0014 mols of PdCl$_2$ and 0.25 mols of HCl for about 30 minutes. Thereafter, the carbon nanotubes may be dipped in a solution in which 0.25 mols of NiC$_2$·6H$_2$O, 0.09 mols of NiSO$_4$·6H$_2$O, 0.054 mols of Na$_2$HC$_6$H$_5$O$_7$·6H$_2$O, 0.084 mols of NaH$_2$PO$_2$·2H$_2$O, 1.87 mols of NH$_4$Cl, 0.0075 mols of Pb(NO$_3$)$_2$ and 8.75 mols of NH$_4$OH are dissolved, so that the carbon nanotubes can be electrolessly plated with Ni. When the electrodes 100 are formed of such Ni-plated carbon nanotubes, the internal resistance of the electrodes 100 is considerably reduced to 0.3 Ω·cm compared to internal resistance of 3.5 Ω·cm appearing in a case where the carbon nanotubes are not electrolessly plated with Ni.

The reduction of internal resistance can also be achieved by applying Raney Ni to carbon nanotubes. For example, Raney Ni is mixed with carbon nanotubes, and then the mixture is stirred in an acetone solution so that the Raney Ni is uniformly applied on the carbon nanotubes. In this case, the internal resistance of the electrodes 100 is reduced to 0.9 Ω·cm. By reducing the internal resistance of the electrodes 100 as described above, the efficiency of a supercapacitor can be increased.

A supercapacitor according to the embodiment of the present invention as described above can have greatly increased capacitance and lower internal resistance. These effects produce advantages such as fast charging, high charging/discharging efficiency of at least 95%, a large number of possible reuses (at least one hundred thousand) and a large power density which a secondary cell does not have. These effects also suggest that a supercapacitor according to the present invention can be used as an energy storage device such as a secondary cell or a fuel cell which are used as a main device of, for example, an electric automobile or as an energy storage device having a load control function. In particular, it is inferred that a supercapacitor according to the present invention can be used in substitute for a secondary cell in a hybrid electric automobile having a small internal-combustion engine.

A supercapacitor according to the present invention can have capacitance of, for example, at least 0.9 F/m$^2$ and 400 F/g, which is much higher than the capacitance of an existing supercapacitor, i.e., capacitance of 10–15 μF/m$^2$ and 100–250 F/g. Moreover, a supercapacitor according to the present invention can have internal resistance of, for example, about 0.3 Ω·cm, which is much lower than the internal resistance of an existing supercapacitor, i.e., internal resistance of about 3.2–20 Ω·cm. Therefore, according to the present invention, a supercapacitor having the characteristics of high energy density and high power can be manufactured and used as an energy storage device in place of an existing secondary cell.

What is claimed is:

1. A method of manufacturing a supercapacitor, the method comprising the steps of:

preparing two electrodes which include carbon nanotubes;

providing a separator and an electrolyte between the two electrode; and activating the carbon nanotubes, wherein the activating step includes:
   dipping the carbon nanotubes in the solution containing potassium hydroxide;
   drying the carbon nanotubes; and
   thermally treating the dried carbon nanotubes.

2. The method of claim 1, wherein the carbon nanotubes are single-wall carbon nanotubes.

3. The method of claim 1, wherein the carbon nanotubes are multi-wall carbon nanotubes.

4. The method of claim 1, wherein the step of preparing each of the electrodes comprises the steps of:

molding the carbon nanotubes mixed with a bonding agent into a pallet pattern; and attaching the pallet pattern of the carbon nanotubes to a collector.

5. The method of claim 1, wherein the step of preparing each of the electrodes comprises vertically growing the carbon nanotubes on a collector.

6. The method of claim 5, wherein the carbon nanotubes are vertically grown using a thermal chemical deposition method or a microwave plasma chemical deposition method.

7. The method of claim 1, further comprising the step of activating the carbon nanotubes using a solution containing potassium hydroxide.

8. The method of claim 1, wherein in the thermal treatment step, the carbon nanotubes are thermally treated at a temperature of about 750–800° C. in an inert gas atmosphere.

9. The method of claim 1, further comprising the step of electrolessly plating the carbon nanotubes with nickel.

10. The method of claim 1, further comprising the steps of uniformly applying Raney nickel on the carbon nanotubes.

* * * * *